United States Patent [19]

Van Buul

[11] Patent Number: 4,805,079

[45] Date of Patent: Feb. 14, 1989

[54] SWITCHED VOLTAGE CONVERTER

[75] Inventor: Marinus C. W. Van Buul, Breda, Netherlands

[73] Assignee: U.S. Philips Corp., New York, N.Y.

[21] Appl. No.: 40,951

[22] Filed: Apr. 21, 1987

[30] Foreign Application Priority Data

May 6, 1986 [NL] Netherlands ............... 8601150

[51] Int. Cl.$^4$ ..................................... H02H 7/122
[52] U.S. Cl. ........................................ 363/56; 363/20; 363/124; 363/132
[58] Field of Search ............... 363/17, 20, 56, 98, 363/131, 132

[56] References Cited

U.S. PATENT DOCUMENTS

| | | | |
|---|---|---|---|
| 4,268,898 | 5/1981 | Brown | 363/20 |
| 4,365,171 | 12/1982 | Archer | 363/20 |
| 4,370,701 | 1/1983 | Western | 363/20 |
| 4,489,373 | 12/1984 | du Parc | 363/124 X |
| 4,502,085 | 2/1985 | Morrison et al. | 363/132 X |

FOREIGN PATENT DOCUMENTS

| | | | |
|---|---|---|---|
| 0130771 | 8/1983 | Japan | 363/56 |
| 0202623 | 11/1983 | Japan | 363/56 |

*Primary Examiner*—Patrick R. Salce
*Assistant Examiner*—Kristine Peckman
*Attorney, Agent, or Firm*—Bernard Franzblau

[57] ABSTRACT

A switched voltage converter formed asymmetrically or symmetrically with one (S1) or two controlled semiconductor switches, respectively, connected in a series arrangement, with a first coil (L1) and a first semiconductor switching element (D1), for example, a diode. The coil is connected to a terminal of a first (C1) and a second (C2) capacitor. Arranged in parallel with the switch (S1) is a series arrangement of the first capacitor (C1) and of the parallel arrangement consisting of a second coil (L2) and a second diode (D2) in series and of a third diode (D3) and a third capacitor (C3) also in series. The junction point of the third diode (D3) and the third capacitor (C3) is connected to the first diode (D1) via a d.c. conection comprising a fourth (D4) and a fifth (D5) diode. The junction point of the fourth (D4) and a fifth (D5) diode is connected via the second capacitor (C2) to the junction point of the first coil (L1) and the first diode (D1). The coil (L1) also has an inductive load (L0) connected to it. The converter operates with a snubber circuit for voltage changes at the switch (S1) by the use of the third diode (D3) and the third capacitor (C3). If this circuit can be dispensed with, the converter is used without the third capacitor (C3) and the fifth diode (D5). The third diode (D3) is then connected to the junction point of the second capacitor (C2) and the fourth diode (D4). The converter then operates only with a snubber circuit for current changes.

17 Claims, 7 Drawing Sheets

SWITCHED VOLTAGE CONVERTER

This invention relates to a switched voltage converter having at least one controlled semiconductor switch and a first coil each having a first and a second connection, the first connections being connected together in a series arrangement with at least the one controlled semiconductor switch and the first coil present between supply voltage terminals. The controlled semiconductor switch is connected to a terminal for the supply of a switching signal for turning the semiconductor switch alternately on and off for obtaining a desired voltage at a converter terminal. The first coil being coupled to a first connection of an inductive load formed with the first and a second connection and the second connection of the first coil is coupled to a first electrode of a first semiconductor switching element formed with the first and a second electrode, the first connections of the semiconductor switch and the first coil being connected to a first terminal of a capacitor, a second terminal of which is connected via a series arangement with a second semiconductor switching element and a second coil to the second connection of the semiconductor switch. The second terminal of the capacitor is connected to a first electrode of a third semiconductor switching element formed with the first and a second electrode, the current pass direction of the controlled semiconductor switch, viewed in a given direction of the current through the capacitor, being equal to that of the first and the second semiconductor switching element and being opposite to that of the third semiconductor switching element.

A voltage converter of this type is described in U.S. Pat. No. 4,489,373. To keep the power dissipation as low as possible, the converter has no resistors. The dissipation is mainly present upon turning on and off the controlled semiconductor switch in the form of a bipolar transistor and the semiconductor switching elements in the form of diodes. To protect the transistor from a high switching overvoltage upon turning off and from a high switching current upon turning on, two speed limiting circuits for voltage changes and current changes, respectively, are provided which are commonly referred to as "snubber" circuits. Starting from the described structure of the converter, these circuits are formed by connecting the second electrode of the third semiconductor switching element formed as a diode to a supply voltage terminal conveying a voltage that is half of the supply voltage occurring across the said series arrangement of the transistor, the first coil and the first diode. The capacitor thereby prevents a too rapid increase of the switching voltage upon turning off the transistor, which increase is caused by the energy stored in the first coil, while the third diode is conducting. When the transistor is turned on, a too high switching current through this transistor is prevented. This current is caused by discharging of the capacitor by the second coil which is present in series with the then conducting second diode. By a given choice of the capacitance of the capacitor and of the inductances of the two coils a compromise must be found with regard to a minimum turn-off period which is required for the discharge of the first coil and the high switching voltage caused thereby, and a minimum turn-on period which is required for discharging the capacitor and the high switching current caused thereby. This compromise is influenced by the maximum rate of the increase in voltage and current in and through the semiconductor switch, the maximum voltage across the semiconductor switch and the semiconductor switching elements and the maximum current therethrough. It is stated that the choice of half the supply voltage to be applied to the capacitor via the third diode requires this capacitor to be dimensioned only to resist an alternating voltage of approximately the same value, which implies a decrease by half the value as compared with known converters. However, the switching overvoltages that occur are not taken into account.

The use of half the supply voltage requires this voltage to be also available at the supply voltage source, which is not always the case, so that additional provisions have to be made at the supply voltage source. A further drawback is that the capacitor is active in the snubber circuit for voltage changes and in that for current changes, which leads to the compromise solution described. In present-day practice semiconductor switches are found to be available which can satisfactorily withstand a very rapid increase of the switching voltages when they are used in voltage converters.

SUMMARY OF THE INVENTION

It is an object of the invention to realize a switched voltage converter which is active with a semiconductor switch in which in the first instance only a snubber circuit for current changes is present which results in limited switching overvoltages. To this end a switched voltage converter according to the invention is characterized in that the second electrode of the third semiconductor switching element is coupled via a second capacitor to the second connection of the first coil and is coupled via a fourth semiconductor switching element in a d.c. connection comprising the third and fourth semiconductor switching elements to the second electrode of the first semiconductor switching element, in respect of which electrode the first and fourth semiconductor switching elements have the same current pass direction.

In the described structure of the voltage converter the capacitance of the first-mentioned and the second capacitor can be chosen as desired for obtaining a limited switching overvoltage upon turning off the controlled semiconductor switch. The capacitance of the second capacitor also determines the maximum voltage across the first and fourth semiconductor switching elements. The fourth semiconductor switching element is active as a clamping diode in the same manner as the first semiconductor switching element.

It is not sufficient to use only the snubber circuit for current changes in the semiconductor switch, but if there must also be a snubber circuit for voltage changes, an embodiment of a voltage converter according to the invention is characterized in that the second electrode of the third semiconductor switching element is connected both via a third capacitor to the second connection of the semiconductor switch and via a fifth semiconductor switching element to a junction point between the second capacitor and the fourth semiconductor switching element, the third, fifth and fourth semiconductor switching elements having the same current pass direction constituting the said d.c. connection.

This provides the advantage that the chosen dimensioning of the capacitors and the coils present mutually independent selection possibilities for the values of the voltage changes, the current changes and the switching overvoltages in the semiconductor switch and the semiconductor switching elements.

An embodiment in which a choice can be made as to which converter terminal is active as an output terminal of the converter at the desired voltage is characterized in that in the case of a connection of a first supply voltage terminal to the second connection of the semiconductor switch and of a second supply voltage terminal to the second electrode of the first semiconductor switching element or to the second connection of the inductive load, the said converter terminal conveying the desired voltage is connected to the second connection of the inductive load or to the second electrode of the first semiconductor switching element, respectively.

In the case of a larger power rating, in which the switched voltage converter is formed symmetrically, the use of both a snubber circuit for voltage changes and a snubber circuit for current changes is required. An embodiment of a switched voltage converter in the form of a symmetrical converter having two controlled semiconductor switches, one of which is connected to the one connection and the other of which is connected to the other connection of the first coil, in which the first connection of the inductive load is connected to a tapping on the first coil and each controlled semiconductor switch is present in an associated circuit formed with the first-mentioned and second capacitors, the second coil and the first, second, third and fourth semiconductor switching elements, is characterized in that in the associated circuit the second electrode of each third semiconductor switching element is connected via a third capacitor to the second connection of the relevant semiconductor switch.

A further embodiment is characterized in that the first coil and the second coil are wound on a common core. In addition to the economy in cores, if coils with cores are used, there are the advantages of a lower voltage change rate when a semiconductor switch is turned off, lower switching overvoltages and a faster termination of transient phenomena.

An embodiment of a voltage converter according to the invention with a high-frequency decoupling between supply voltage terminals and a converter output terminal is characterized in that the second connection of the inductive load is connected via a fourth and a fifth capacitor to the second connection of the semiconductor switch and to the second electrode of the first semiconductor switching element, respectively.

BRIEF DESCRIPTION OF THE DRAWINGS

The invention will now be described in greater detail, by way of example, with reference to the accompanying drawing, in which.

DESCRIPTION OF THE PREFERRED EMBODIMENTS

Figure 1:
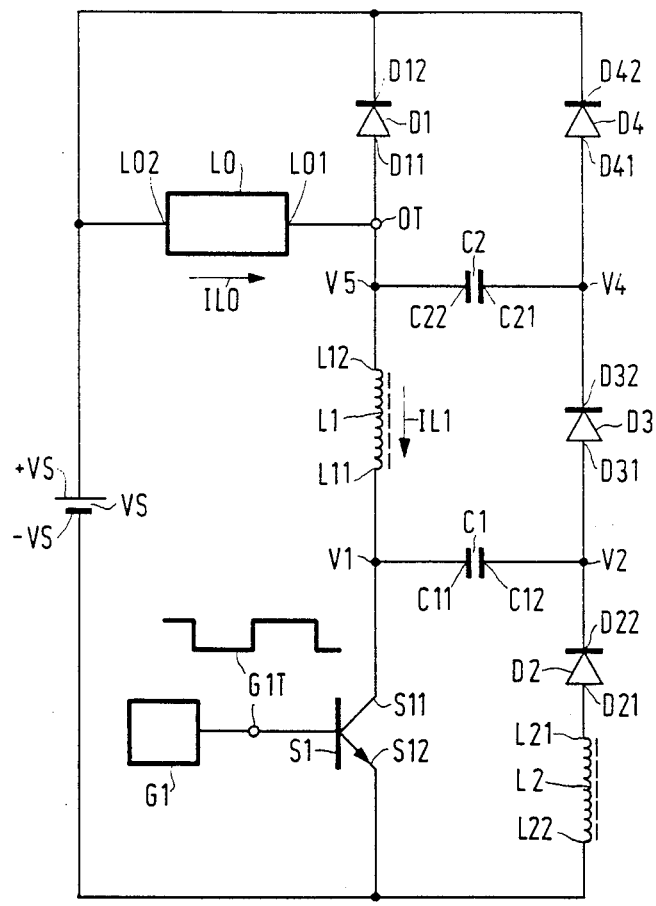
FIG. 1 shows a circuit diagram of a switched voltage converter according to the invention which operates with a snubber circuit for current changes only.
Figure 2:
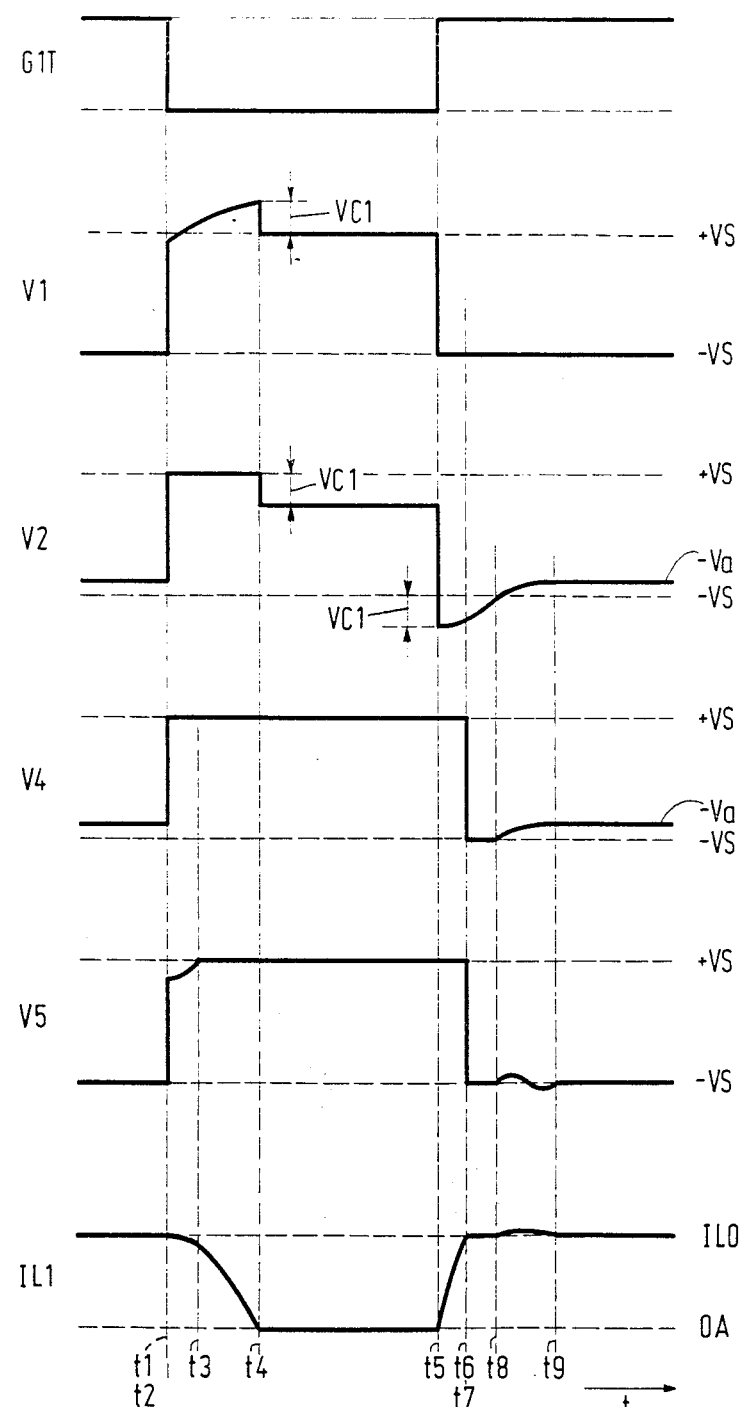
FIG. 2 shows some signal diagrams as a function of time to illustrate the operation of the converter of FIG. 1, FIGS. 3 and 5 show circuit diagrams of a converter operating with snubber circuits for both current and voltage changes.
Figure 3:
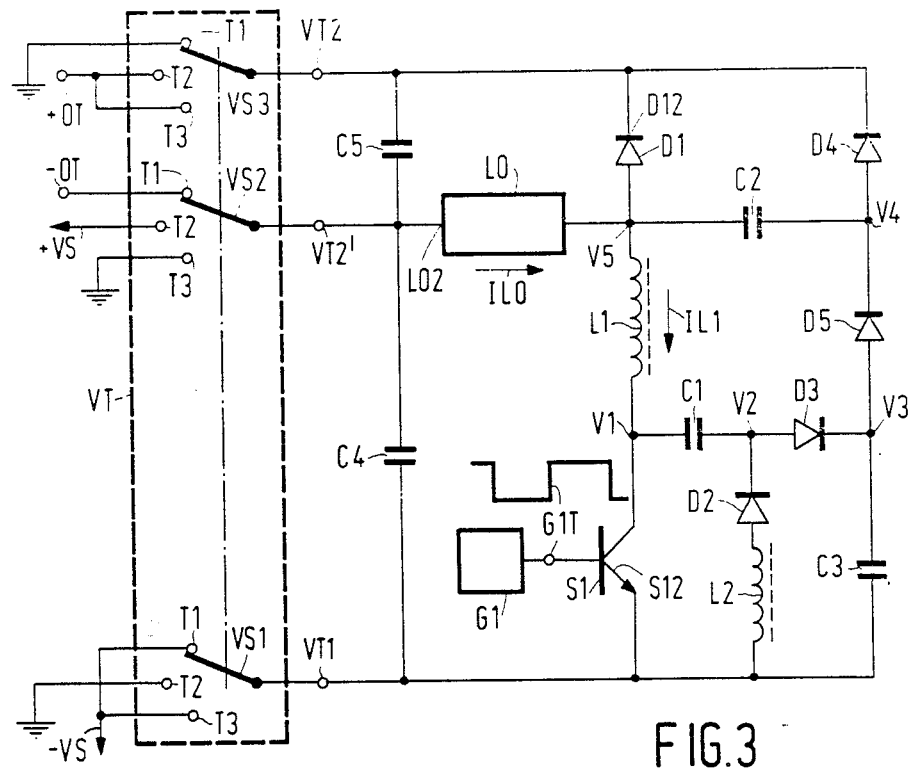
Figure 5:
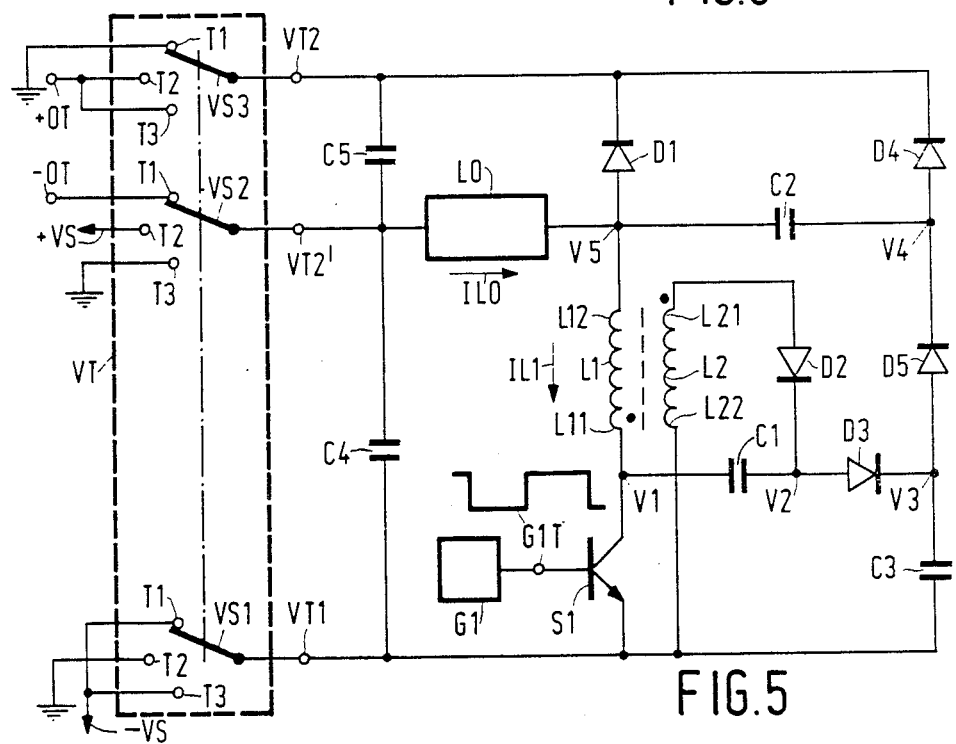
Figure 4:
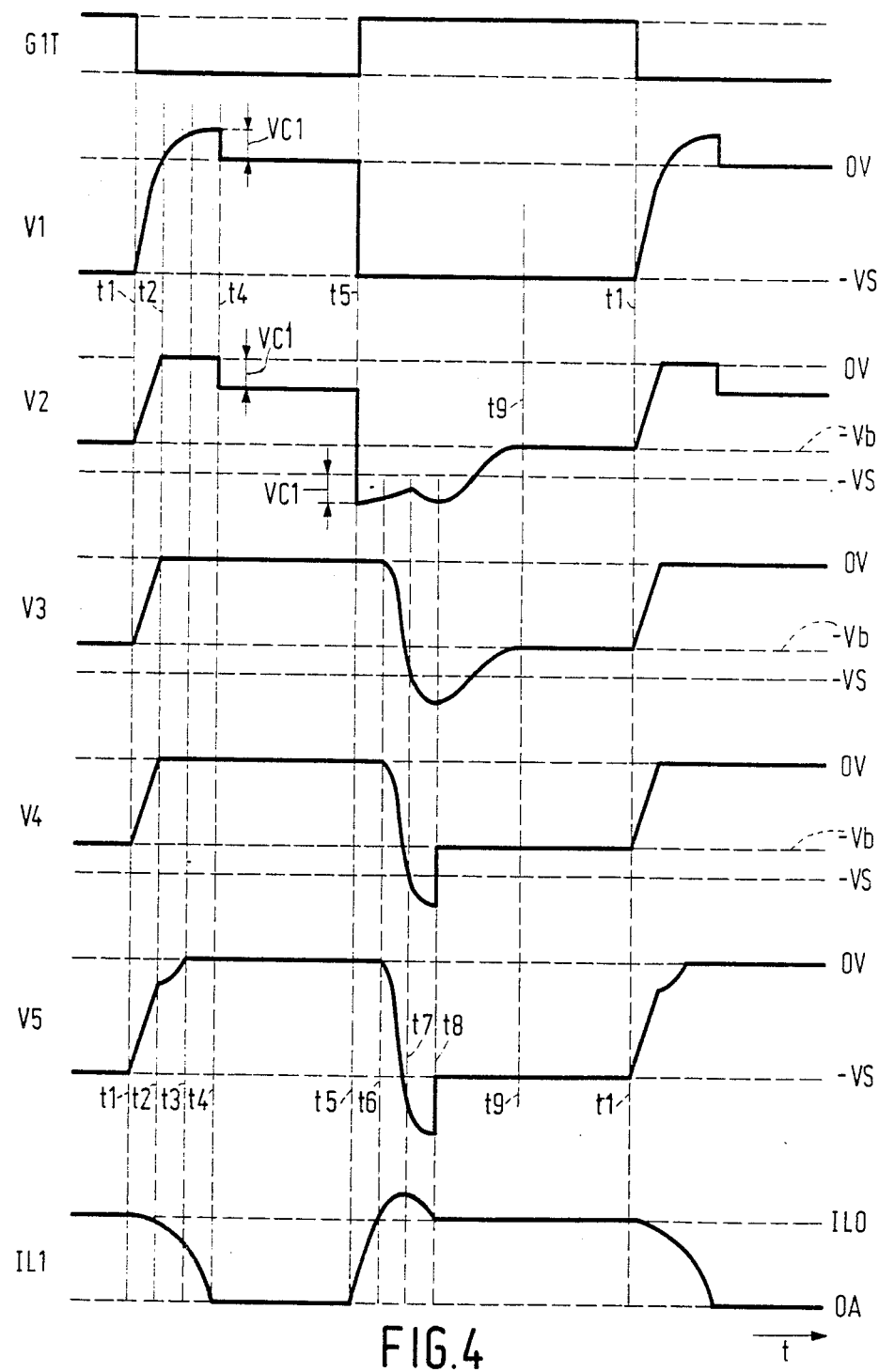
FIGS. 4 and 6 show associated signal diagrams.
Figure 6:
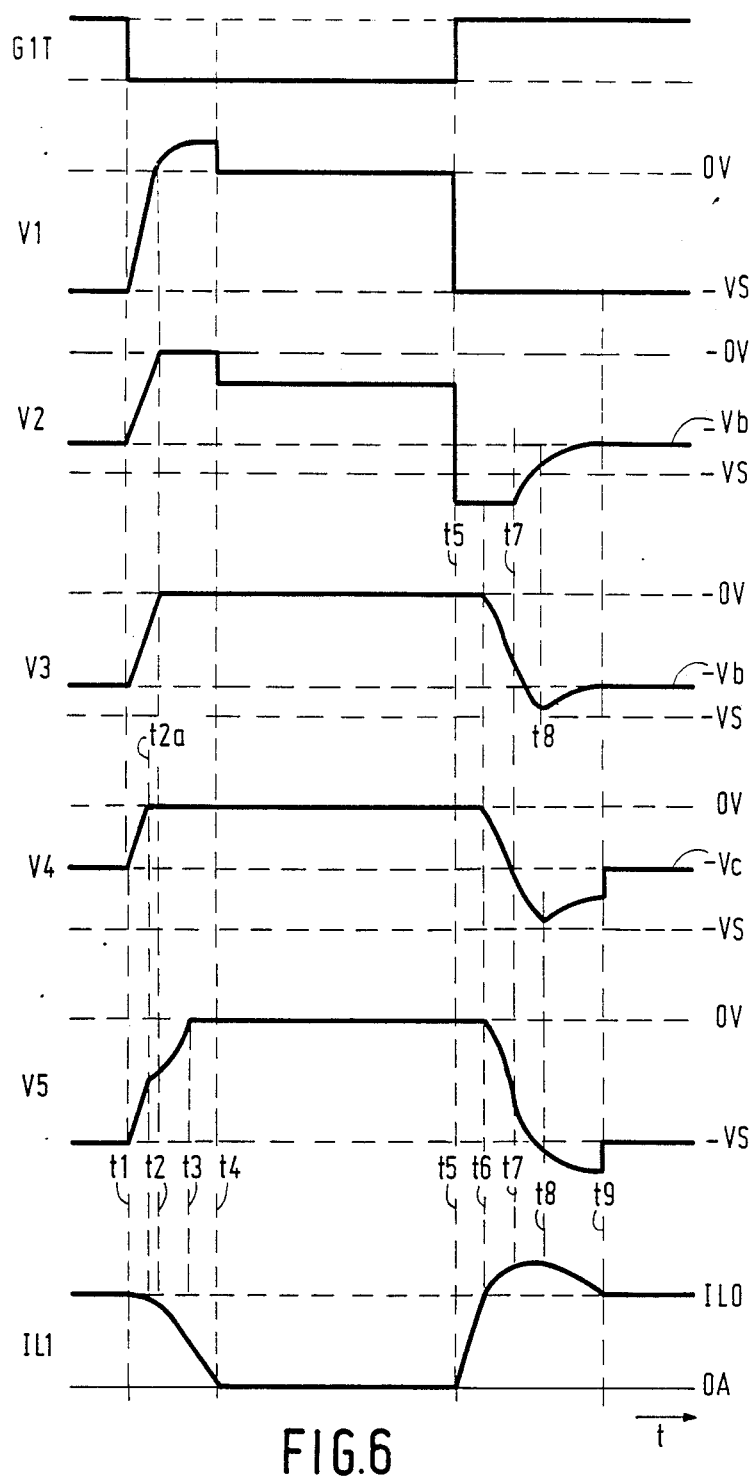

In the circuit diagrams shown in FIGS. 1, 3, 5, 7 and 9 the same circuit components are denoted by the same references. In FIG. 1, which shows the simplest circuit diagram of a switched voltage converter according to the invention which operates with a speed limiting or snubber circuit for current changes only, connections, terminals and electrodes at the components are denoted by references which for the sake of surveyability of the other Figures are omitted for the greater part in these Figures. Starting from the circuit structure of an asymmetrical converter shown in FIGS. 3 and 5 the same references have been used for similar components in FIGS. 7 and 9 for a symmetrical converter structure and the remaining components are denoted by primed references. In FIGS. 2, 4, 6 and 8 similar signal diagrams are shown diagrammatically and in a simplified form as a function of time t, and they are denoted by the same references G1T, V1, V2, V3, V4, V5 and IL1. In the associated circuit diagrams the same references denote the locations where these signals occur. In the signal diagrams instants t1 to t9 are denoted in a duty cycle of the converter to be described. In FIG. 2 instants t1 and t2, and t6 and t7 respectively, coincide and the signal diagram V3 does not occur. FIGS. 6 and 8 show an intermediate instant denoted by t2a and t4a, which occurs before the instants t2 and t4, respectively, and which is introduced to illustrate an instant which is special for this Figure. The signal diagram G1T is associated with a switching signal which has a square-wave variation in a cycle between two values which are not indicated. FIG. 4 shows an entire duty cycle of the converter according to FIG. 3. The signal diagrams V1 to V5 are voltage diagrams in which possibly present supply voltage values are denoted by +VS, −VS and 0V as the ground potential. The signal diagram IL1 shows a current diagram in which a current value IL0 and a zero current 0A are denoted.

Starting with the simplest embodiment of the switched voltage converter according to the invention, FIG. 1 shows a controlled semiconductor switch S1, a first coil L1 connected thereto and a subsequent semiconductor switching element D1 which are present between supply voltage terminals −VS and +VS of a supply voltage source VS. The semiconductor switch S1 is shown as a bipolar transistor of the npn type. The collector of the transistor S1 is indicated by a first connection S11 and its emitter is indicated by a second connection S12 which is connected to the terminal −VS. The base of the transistor S1 is connected to a terminal G1T for the supply of a switching signal denoted by the same reference, which signal originates from a switching signal generator G1. Under the control of the switching signal G1T the transistor S1 functions as a controlled semiconductor switch and is alternately conducting and non-conducting, or in other words turned on and turned off. Instead of the bipolar design of the transistor shown, the switch S1 may be in the form of a field effect transistor, a thyristor or a controlled semiconductor switch of another type.

The first connection S11 of the switch S1 is connected to a first connection L11 of the first coil L1, which has a second connection L12, as shown. The coil L1 may be formed with or without a core which is shown by a broken line. At the coil L1 an arrow denotes the positive current direction of a current IL1 possibly flowing through the coil. The voltage occurring at the junction point of the first connections S11 and L11 is denoted by V1. The second connection L12 of the coil L1 is coupled to a first electrode D11 of the semiconductor switching element D1, shown as a diode, which element also has a second electrode D12 connected to the supply voltage terminal +VS. The first and second electrodes D11 and D12 are the anode and the cathode, respectively, of the diode D1. Similarly FIG. 1 shows a second, third and fourth semiconductor switching element D2, D3 and D4 formed as diodes with first and second electrodes D21 and D22, D31 and D32 and D41 and D42, respectively. It will be evident from the description of the circuit diagrams of FIGS. 7 and 9 that the semiconductor switching element D1 may form part of a controlled semiconductor switch in the form of a field effect transistor conducting current in two directions. A junction point conveying the voltage V5 is shown between the connection L12 and the electrode D11 and a converter terminal 0T conveys a desired voltage to be supplied to a first connection L01 of an inductive load L0, a second connection L02 of which is connected to the supply voltage terminal +VS. As in the said patent, the inductive load L0 is, for example, a motor coil of a d.c. motor. The presence of an inductive/ohmic series arrangement or network is mentioned as a further example. Independent of the construction, it is stated that the inductance of the load L0 is so large that in the switching converter this load conveys a substantially constant current IL0 whose positive current direction is denoted by an arrow.

The connections S11 and L11 conveying the voltage V1 are connected to a first terminal C11 of a first capacitor C1 which also has a second terminal C12 at which the voltage V2 occurs. The terminal C12 is connected to the connection S12 of the switch S1 via a series arrangement of the second diode D2, operative as a semiconductor switching element, and a second coil L2. A first connection L21 of the second coil L2 (which may include, for example, a core) is connected to the anode, as a first electrode D21, of the diode D2. In the series arrangement (D2, L2) the diode D2 and the coil L2 may change position.

The second capacitor terminal C12 is also connected to an anode, as a first electrode D31, of the third semiconductor switching element formed as a diode D3. The cathode as a second electrode D32, conveying the voltage V4 is connected both to a first terminal C21 of a second capacitor C2 and to an anode, as a first electrode D41, of the fourth semiconductor switching element in the form of a diode D4. The terminal C22 is connected to the connection L12 of the coil L1. The cathode, as a second electrode D42, of the diode D4 is connected to the cathode D12 of the diode D1 so that both have the same current pass direction with respect to the junction point.

In FIG. 1 the current pass directions of the transistors S1 and the diodes D1, D2, D3 and D4 are shown in relation to the given polarity at the supply voltage terminals +VS and −VS. Generally the current pass direction of the transistor S1, with respect to a given direction of the current through the first capacitor C1, is equal to that of the first diode D1 and the second diode D2 and is opposite to that of the third diode D3 and the fourth diode D4. The first diode switch D1 and the transistor switch S1 are connected in series opposition between the pair of supply voltage terminals +VS and −VS. The second and third diodes, D2 and D3, are connected with opposite polarity as viewed from their common terminal at V2.

For the description of the operation of the voltage converter of FIG. 1 (and FIGS. 3, 5 and 7) the starting point is a first stable (initial) state in which the switch S1 is turned on. Subsequently the switch is turned off and after reaching another second stable state, the switch is turned on again whereafter the first stable state is reached again. The switching signal G1T shown in FIG. 2 is associated therewith. Before the instant t1,t2 and in the initial state the current IL0 flows from the terminal +VS to the terminal −VS via the inductive load L0, the coil L1 and the transistor S1. FIG. 2 shows that IL1=IL0, V1=V5=−VS and VS=V4=−Va. The capacitors C1 and C2 both convey a voltage (VS−Va). The diodes D are non-conductive, while the diodes D1, D2 and D4 are in the cut-off state and the diode D3 is biased into its conducting state due to the presence of the same voltage at anode and cathode. In the description of the operation of the diodes D, diode threshold voltages and diode voltage drops in the conductivity direction are ignored.

At the instant t1,t2 the transistor S1 is turned off and voltage steps shown at the voltages V1, V2, V4 and V5 occur. The voltages V2 and V4 indicate that upon reaching the value +VS at this instant the diodes D3 and D4 start conducting and operate as clamping diodes.

From the instant t1,t2 to the instant t3 the current IL1 charges the capacitor C1 and the discharge current (IL0−IL1) discharges the capacitor C2, which is evident from the voltages V1 and V5 and the current IL1 shown. The voltages V2 and V4 then maintain the value +VS.

At the instant t3 the voltage V5 reaches the value +VS while the capacitor C2 is entirely discharged and the diode D1 starts conducting as a clamping diode.

From the instant t3 to the instant t4 the current IL1 further charges the capacitor C1 (increasing voltage V1) until this current becomes zero. During this period the voltages, V2, V4 and V5 maintain the value +VS.

At the instant t4 IL1=0A and the diode D3 is cut off. At this instant the voltage across the coil L1 becomes equal to zero (VL1 becomes 0V) and a voltage step VC1 occurs in the voltages V1 and V2. The voltage VC1 is the voltage across the charged capacitor C1.

After the instant t4 the second stable state is present in which the current IL0 flows in a circuit with the inductive load L0 and the diode D1. Here applies that V1=V4=V5=+VS and V2=+VS−VC1 from which it follows that the capacitor C2 is not charged and the capacitor C1 conveys the voltage VC1. It is to be noted that the non-conducting diode D4 is biased into its conducting state when the transistor S1 is turned off and the diodes D2 and D3 are cut off.

It is assumed that the second stable state is present until the instant t5. At the instant t5 the transistor S1 is turned on under the control of the switching signal G1T. The voltage V1 acquires a voltage step to the value −VS, while the same step gives the value (−VS−VC1) in the voltage V2 via the capacitor C1, whereupon the diode D2 can start conducting.

From the instant t5 to the instant t6,t7 the capacitor C1 is discharged via an increasing current through the coil L2 and the conductive diode D2 in a resonant circuit (L2, C1), which has the result shown at the voltage V2. Voltages V5 (=+VS) and V1 (=+VS) show that the voltage value 2VS is present across the coil L2 so that the current IL1 increases in accordance with the formula dI/dt=2VS/L1, with L1 being equal to the inductance of the coil. The converter of FIG. 1 operates with a snubber circuit (L1, L2, D2, D3, D4, C1, C2) for current charges dI/dt, with the diode D2 conducting and the diodes D3 and D4 non-conducting. During the period t5 to t6,t7 the current ID1 through the diode D1 decreases to zero because there applies that: ID1=IL0−IL1.

At the instant t6,t7 the current through the diode D1 has become equal to zero and the diode D1 is cut off. The diode D4, biased to its state of conductance, is also cut off. The result is a voltage step in the voltages V4 and V5 to the value −VS.

From the instant t6,t7 to the instant t8 there applies that IL1=IL0, or VL1=V5 −V1=OV and the capacitor C1 is further discharged in the resonant circuit (L2, C1) to VC1=OV. The voltages V4 and V5 maintain the value −VS.

At the instant t8 the capacitor C1 is completely discharged and there applies that V2=V4=−VS so that the diode D3 starts conducting.

From the instant t8 to the instant t9 the energy stored in the coil L2 produces a current through the coil L2 and the diode D2 which directly charges the capacitor C1 and charges the capacitor C2 through the diode D3 and the coil L1 until the current through the coil L2 becomes zero. During this period the voltages V2 and V4 change to the value −Va. In the resonant circuit (L2, C1, C2, L1) the voltage V5 has the variation shown. The increase of the current through the coil L1 is shown by the current waveform IL1.

At the instant t9 the current through the coil L2 has become zero and the diodes D2 and D3 are cut off. At this instant the value −Va is reached in the voltages V2 and V4 and the value −VS is present in the voltages V1 and V5, while there applies that IL1=IL0.

After the instant t9 the first stable (initial) state is present again, with the current IL0 flowing through the coil L1 and the transistor S1, while diodes D1, D2, D3 and D4 are non-conducting. Thi state is present until an instant t1 of a subsequent duty cycle.

It is apparent from FIG. 2 that after the transistor S1 is turned off at the instant t1,t2 the switching voltage V1 has an overvoltage which increases to VC1 during the period between the instants t1,t2 and t4. This overvoltage VC1 depends on the capacitances of the capacitors C1 and C2 because the decreasing current IL1 entirely discharges the capacitor C2 (voltage V5) between the instant t1,t2 and t3 on the one hand and charges the capacitor C1 to the voltage VC1 on the other hand. Due to the choice of the capacitance of the capacitors C1 and C2 the height of the voltage VC1 and the period t1,t2 to t4 are obtainable as desired. The product of voltage and period is constant at a given value for the current IL0.

When the transistor S1 is turned on at the instant t5, the voltage thereacross immediately drops off so that the turn-on losses determined by the product of voltage thereacross and the current therethrough are at a minimum. Furthermore the current through the diode D1 gradually decreases in the period t5 to t6,t7 so that cutting off of the diode D1 at the instant t6,t7 is accompanied by minimum turn-off losses, while the overvoltage VC1 in the switching voltage V2 is obtained, as desired, by the choice of the capacitance for the capacitors C1 and C2.

If there must be snubber circuits for both current and voltage changes, this can be realised in FIG. 1 by detaching the second electrode D32 of the third diode D3 from the junction point conveying the voltage V4 and by connecting it thereto via a fifth diode D5 having the same current pass direction. Furthermore, the electrode D32 is connected via a third capacitor C3 to the second connection S12 of the transistor S1. The junction point conveying the voltage V2 is now connected to the cathode of the diode D1 via the d.c. connection including the diodes D3, D5 and D4, while the junction point of the diodes D3 and D5 and the capacitor C3 conveys the voltage V3. In FIGS. 3 and 5 these connections are shown for asymmetrical converters which are also further modified.

The voltage converters according to FIGS. 3 and 5 are formed with an internal inductive load L0 whose second connection L02 can be connected to a converter output terminal −OT or a supply voltage terminal conveying the voltage +VS or the ground potential. To this end the converter according to FIGS. 3 and 5 is provided, for example, with a changeover device VT formed with connection terminals VT1, VT2 and VT2' via which device converter output terminals +OT and −OT and supply voltage terminals conveying the voltages +VS and −VS and the ground potential at OV can be connected, respectively to the connection S12 of the transistor S1, the cathode D12 of the diode D1 or the connection L02 of the internal inductive load L0. For high-frequency decoupling between supply voltage terminals and a converter output terminal +OT or −OT, the connection L02 of the load L0 is connected via respective fourth and fifth capacitors C4 and C5 to the connection S12 or the cathode D12. The fourth and fifth diodes D4 and D5 are connected series aiding in the DC path or connection from the junction of D3 and C3 to the cathode D12 of diode D1.

The change-over device VT is shown with three coupled change-over switches VS1, VS2 and VS3 each having three change-over terminals T1, T2 and T3. In the case shown in FIGS. 3 and 5 with interconnected change-over terminals T1, the terminals VT1 and VT2 are connected to the voltage −VS and to ground, respectively, and the terminal VT2' is connected to the converter output terminal −OT. In the case of interconnected change-over terminals T2, the terminals VT1 and VT2' are connected to ground and to the voltage +VS, respectively. In the case of interconnected change-over terminals T3, the terminals VT1 and VT2' are connected to the voltage −VS and to ground, respectively. In the two latter cases the converter output terminal +OT is connected to the terminal VT2.

With the aid of the change-over device VT the converter according to FIG. 3 or 5 can be used in all three known basic forms of switched voltage converters. For example, the converter in the state T1 operates as a series or forward converter, in the state T2 as a step-up converter and in the state T3 as a parallel or reverse converter. Independent of the state T1, T2 or T3 the converter output terminals −OT and +OT are available for connection to an ohmic, ohmic-inductive or ohmic-capacitive load, not shown.

For the state T1 shown of the converter of FIG. 3, some signal diagrams are plotted diagrammatically and in a simplified form in FIG. 4 in the manner described with reference to FIG. 2, more specifically for an entire duty cycle with the instants t1,t2, ... and so forth ... t9 until the next instant t1.

Before the instant t1 the current IL0 in the assumed first stable (initial) state flows from the terminal VT2' to the terminal VT1 conveying the voltage −VS via the internal inductive load L0, the coil L1 and the transistor S1. For FIG. 4 there applies that IL1=IL0, V1=V5=−VS and V2=V3=V4=−Vb. The capacitors C1, C2 and C3 each convey a voltage (VS-Vb). The diodes D1, D2 and D4 of the non-conducting diodes D are in the cut-off state and the diodes D3 and D5 are biased into their state of conductance.

At the instant t1 the transistor S1 is turned off under the control of the switching signal G1T.

From the instant t1 to the instant t2 the decreasing current IL1 charges the capacitor C3. The converter of FIG. 3 operates with a snubber circuit (D3, C3) for voltage changes dV/dt.

At the instant t2 the voltage V3 reaches the ground potential of 0V and the diodes D5 and D4 start conducting and become active as clamping diodes.

From the instant t2 to the instant t3 the voltages V2, V3 and V4 maintain the voltage 0V. While the current IL1 continues to charge capacitor C1, the current (IL0−IL1) simultaneously discharges the capacitor C2, which is evident from the voltages V1 and V5 and current IL1 shown.

At the instant t3 the voltage V5 reaches the voltage 0V with the capacitor C2 being completely discharged and the diode D1 starts conducting as a clamping diode.

From the instant t3 to the instant t4 the current IL1 further charges the capacitor C1 (voltage V1) until this current in the resonant circuit (L1, C1) becomes zero. During this period the voltages V2, V3, V4 and V5 maintain the voltage 0V.

At the instant t4 it can be seen that IL1=0A and the diode D3 is cut off. The voltage across the coil L1 now becomes zero (VL1 becomes 0V) and a voltage step VC1 occurs in the voltages V1 and V2. The voltage VC1 is the voltage across the completely charged capacitor C1.

After the instant t4 the second stable state is present in which the current IL0 flows from the terminal VT2'. via the load L0 and the diode D1 to the terminal VT2. Here there applies that V1=V3=V4=V5=0V and V2=−VC1. The capacitor C1 conveys the voltage VC1 and the capacitor C3 conveys the voltage VS. The diodes D2 and D3 of the non-conducting diodes D2, D3, D4 and D5 are in the cut-off state and the diodes D4 and D5 are biased into their conducting state.

At the instant t5 the transistor S1 is turned on under the control of the switching signal G1T. The voltage V1 acquires a voltage step to the value −VS while the same step gives the value (−VS−VC1) via the charged capacitor C1 in the voltage V2. Consequently the diode D2 can start conducting.

From the instant t5 to the instant t6 the capacitor C1 is discharged via an increasing current through the coil L2 and the diode D2 which has become conducting in a resonant circuit (L2, C1), which has the result shown at the voltage V2. Voltages V5 (=0V) and V1 (=−VS) show that the voltage value VS is present across the coil L1, so that the current IL1 increases in accordance with the formula dI/dt=VS/L1 with L1 being equal to the inductance of the coil. In this case the converter of FIG. 3 is active with a snubber circuit (L1, L2, D2, D3, D4, D5, C1, C2) for the current changes dI/dt, with the diode D2 conducting and the diodes D3, D4 and D5 non-conducting. The diode D3 is cut off and the diodes D4 and D5 are biased into their conducting state. During the period t5 to t6 the current ID1 through the diode D1 decreases to zero because ID1=IL0−IL1.

At the instant t6 the current through the diode D1 has become equal to zero and the diode D1 is cut off. The diode D4 biased into its conducting state is also cut off. From the instant t6 to the instant t7 the capacitor C1 is further discharged in the resonant circuit (L2, C1). The capacitor C3 is discharged in a resonant circuit (C3, C2, L1) with by means of the conducting diode D5 (V4=V3) until the voltage V3 becomes equal to the voltage V2. The increase of the current through the coil L1 is shown by the current waveform IL1.

At the instnat t7 V3=V2, at which the diode D3 starts conducting.

From the instant t7 to the instant t8 the current IL1 decreases to the value IL0 and charges the capacitors C2, C1 and C3 (the latter two being effectively in parallel) in a resonant circuit (C1, C2, C3, L1) with the conducting transistor S1 and diodes D3 and D5 until IL1−1=IL0. The current, not shown through the coil L2 and the diode D2 then continues to increase.

At the instant t8 IL1=IL0 at which th diode D5 is cut off and the voltage across the coil L1 has become zero. The result is a voltage step in the voltages V4 and V5 so that the voltage V4 acquires the value −Vb and the voltage V5 acquires the value −VS.

From the instant t8 to the instant t9 there is a resonant circuit (L2, C1, C3) with the coil L2 and the parallel capacitors C1 and C3 which will decay until the current IL2 through the coil L2 has become zero.

At the instant t9 the current IL2 is equal to zero and the diode D2 is cut off. At this instant the value −Vb is reached in the voltage V2 and V3.

After the instant t9 the first stable (initial) state is present again until the instant t1 of the next duty cycle. In this state the voltage (VS−Vb) is present across all three capacitors C1, C2 and C3.

A comparison of the signal diagrams of FIG. 2 with those of FIG. 4 shows that the voltage step in the voltage V1 at the instant t5 also occurs in the second case, and it has been described with reference to FIG. 2 that this leads to minimum turn on losses at the transistor S2. Turning off the diode D1 at the instant t6 also leads to minimum turn-off losses. An essential difference is the rate limitation in FIG. 4 of the voltage change dV/dt from the instant t1 to the instant t2, mainly in the voltage V1 and consequently in the voltages V2, V3, V4 and V5. This limited voltage change, which limits the turn-off losses of the transistor S1 in known manner, is dependent on the capacitances of the capacitors C1 and C3. In the manner already described the overvoltage VC1 in the switching voltage V1 mainly depends on the capacitance of the capacitor C1. In addition the capacitor C2 also contributes by being first discharged between the instant t2 and t3.

The converter of FIG. 5 differs from the converter shown in FIG. 3 in that the first coil L1 and the second coil L2 are wound on a common core. Apart from the advantage of saving a core if core-provided coils L1 and L2 are used, the converter of FIG. 5 has a lower voltage change rate upon turning off the transistor S1, lower switching overvoltages and shorter transient phenomena. The coil L1 is wound in a given direction on the core, starting from the connection L11 to the connection L12, and the coil L2 is wound in the same direction, starting from the connection L22 to the connection L21. Polarity dots are shown at the connections L11 and L21.

FIG. 6 shows the signal diagrams associated with FIG. 5 in which only differences occurring with respect to the signal diagrams of FIG. 4 will be described.

Before the instant t1 the voltage value −Vc instead of −Vb is present in the voltage V4 in the first stable (initial) state, so that the capacitor C2 conveys a higher voltage (VS−Vc) and the capacitors C1 and C3 convey the lower voltage (VS−Vb).

At the instant t2a the voltage V4 already reaches the voltage OV, so that the diode D4 starts conducting as a clamping diode and the voltage V4 remains constant, while the voltages V1, V2, V3 and V5 will further increase until the instant t2. The capacitor C2 is then discharged by the current (IL0−IL1).

At the instant t2 the diode D5 starts conducting and discharging of the capacitor C2 is continued.

For a description of the signal diagrams between the instants t2 and t5 reference is made to the description of FIG. 4.

At the instant t5 the transistor S1 is turned off and the voltage steps occur in the voltages V1 and V2. The voltage across the coupled coils L1 and L2 is then such that the diode D2 remains cut off.

From the instant t5 to the instant t6 the value of the voltage V2 remains constant due to the cut-off diode D2. Furthermore the current IL1 increases by dI/dt=VS/L1 and the current ID1 through the diode D1 decreases to zero because ID1=IL0−IL1.

After the diode D1 is cut off at the instant t6, the capacitor C3 is discharged via the diode D5 across the capacitor C2 and the coil L1 from the instant t6 to the instant t7 until there applies that: V5+VS=−(V2+VS), that is to say VL1=−VL2.

At the instant t7 with VL1=−VL2 at the coupled coils L1 and L2 the diode D2 starts conducting.

From the instant t7 to the instant t8 the capacitor C3 is further discharged across the capacitor C2 and the coil L1 while the capacitor C1 is discharged via the coil L2 and the diode D2. As long as D3 conducts, VL1=−VL2 continues to apply.

At the instant t8 V2=V3 at which the diode D3 starts conducting.

From the instant t8 to the instant t9 there is a resonant circuit (C1, C2, C3, L1, L2) including the said capacitors and coils and the conducting diodes D2, D3 and D5 until the current through the coil L2 becomes zero and there applies that IL1=IL0.

At the instant t9 the current through the coil L2 is zero and the diodes D2, D3 and D5 are cut off, at which a voltage step occurs in the voltages V4 and V5.

From the instant t9 the first stable (initial) state is present.

It appears that the capacitor C2 in the circuit of FIG. 5 is charged in the first stable state to a higher voltage (VS−Vc) than in the circuit of FIG. 3 with the voltage (VS−Vb). Discharging of the capacitor C2 between the instants t2a and t3 therefore requires more charge, so that on the one hand the voltage change dV/dt in the voltage V1 will be smaller and on the other hand a smaller switching overvoltage occurs in the voltage V1 at the instant t4. Furthermore the coupled coils L1 and L2 of FIG. 5 are found to have a stronger damping with respect to the separate coils L1 and L2 of FIG. 3 at the transient phenomena between the instants t5 and t9, which leads to a faster termination of these phenomena.

Figure 7:
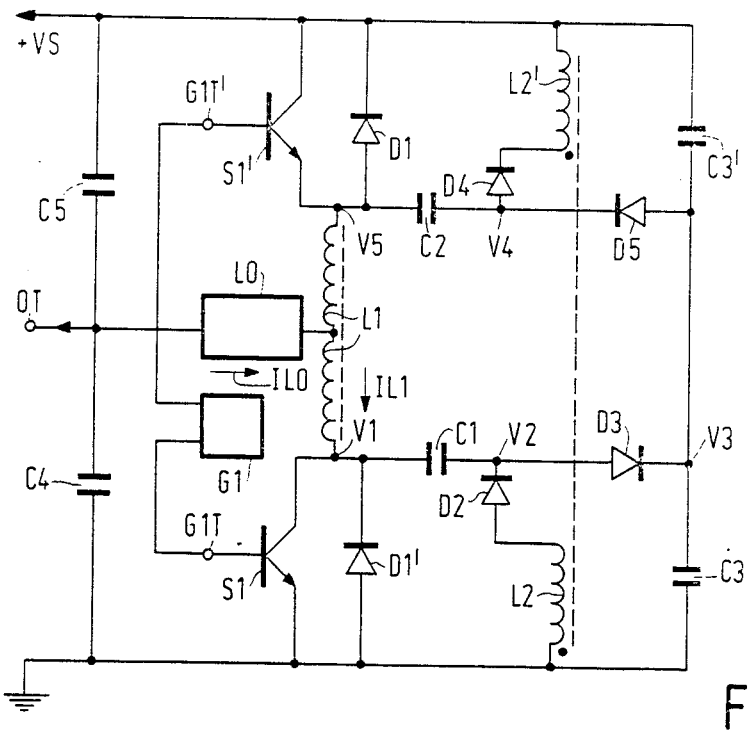
FIG. 7 shows a first circuit diagram of a symmetrical converter according to the invention, operating with snubber circuits for both current and voltage changes.
Figure 9:
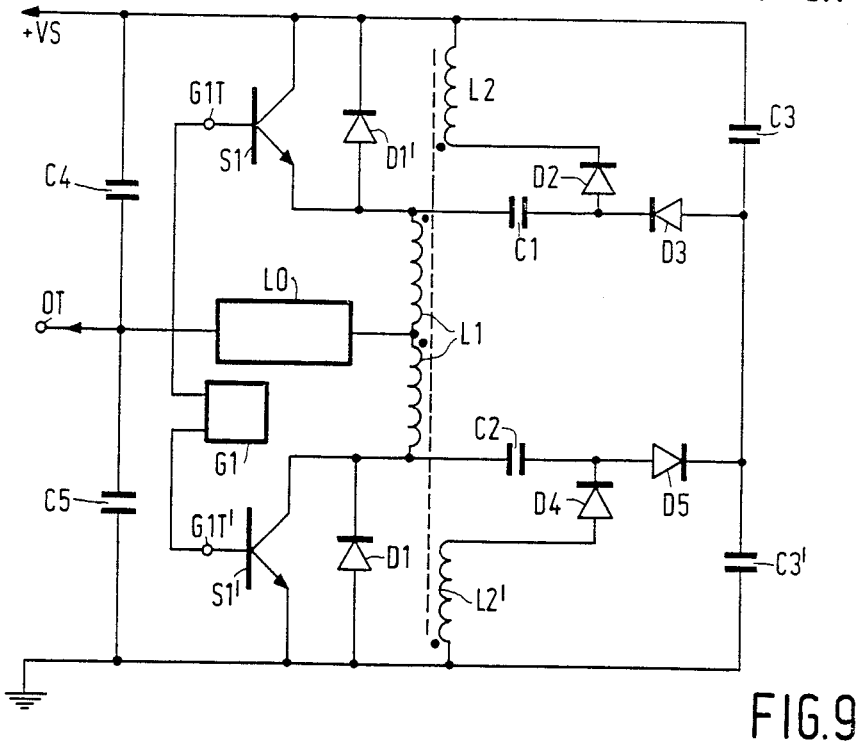
FIG. 9 shows a second circuit diagram of a symmetrical converter embodiment.
Figure 8:
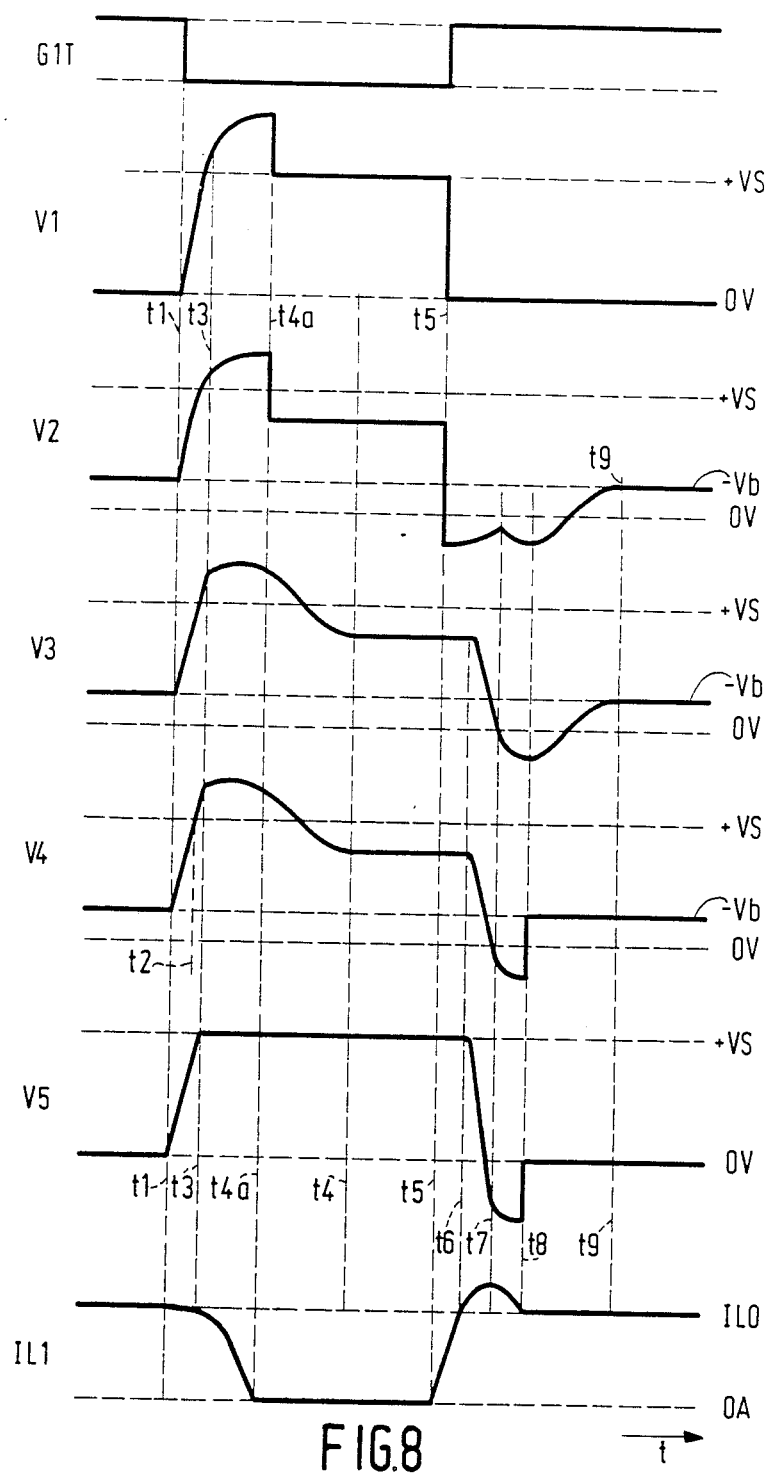
FIG. 8 shows associated signal diagrams.

In the circuit diagrams of FIGS. 7 and 9 showing a symmetrical embodiment of the switched voltage converter, a series arrangement of two semiconductor switches S1 and S1' formed as bipolar transistors and the coil L1 has been shown between a supply voltage terminal +VS and the ground potential. The coil L1 has a tapping to which the internal inductive load L0 is connected, another connection of which is connected to the converter output terminal OT. The coil L1 may consist of two sub-coils with the tapping in between. The switching voltage generator G1 is shown with two outputs which are connected to the respective terminals G1T and G1T' for applying the switching signal to the respective transistors S1 and S1'. Turning the transistors S1 and S1' on and off is effected in known manner, it being required that when one transistor is turned on, the other must be turned off.

Starting from one of the two transistors denoted by S1, FIGS. 7 and 9 show the references which are associated with the circuit diagrams of FIGS. 3 and 5, respectively. The structure of the converter according to FIG. 7 with the transistor S1, the capacitors C1, C2 and C3, the diodes D1, D2, D3, D4 and D5 and the coils L1 and L2 follows from FIG. 3. A diode D1' which is present as a clamping diode for the transistor S1' is arranged in parallel with the transistor S1. A coil L2', which is associated as a second coil with the transistor S1', is arranged in series with the diode D4. The anode of the diode D5 is connected via a capacitor C3' as a third capacitor for the transistor S1' to its collector. The same description is associated with the circuit diagram of FIG. 9, with the difference that the cathode of the diode D5 is connected via the capacitor C3' to the emitter of the transistor S1. Furthermore the coils L2 and L2' in the circuit diagram of FIG. 7 are wound on a common core, which also applies to the coils L1, L2 and L2' in accordance with FIG. 9. The bipolar transistors, S1' and the parallel diodes D1', S1' and D1 may be replaced by a semiconductor switch which can convey current in two directions, such as a field effect transistor. The semiconductor switching element denoted as diode D1 and diode D1' is then a port of the semiconductor switch. The circuit diagrams of FIGS. 7 and 9 are shown with snubber circuits for both current and voltage changes. The two circuits are generally required in the symmetrical converter structure due to their large power rating, so that the sole rate limitation for current changes cannot suffice.

FIG. 8 shows signal diagrams associated with FIG. 7 in which only differences occurring with respect to the signal diagrams of FIG. 4 will be described. The signal diagrams of FIG. 8 are associated with the transistor S1 being turned off and on, while the transistor S1' is turned off.

From the instant t2 to the instant t3 the current IL1 continues to charge the capacitors C1, C3 and C3'. The current through the diode D3 and the coil L2' starts to flow slowly so that the voltages V2, V3 and V4 have a variation trailing the variation of the voltage V1.

From the instant t3 to the instant t4a the current through the coil L2' further increases so that the voltages V2, V3 and V4 have a variation increasingly trailing the variation of the voltage V1. Furthermore the capacitors C2, C3 and C3' are effectively in parallel and these capacitors, in series with the capacitor C1, are still further charged by the current IL1 until it becomes zero.

At the instant t4a IL1=OA and a voltage step occurs in the voltages V1 and V2 because the diode D3 is cut off.

From the instant t4a to the instant t4 the values of the voltages V1 and V2 are constant, while the voltages across the capacitors C2, C3 and C3' in a resonant circuit (C2, C3, C3', L2') change, as is shown by the voltages V3 and V4 until the current through the coil L2' becomes zero.

At the instant t4 the current through the coil L2' is zero and the diode D4 is cut off.

The second stable state is present from the instant t4 to the instant t5.

For a description of the operation after turning on the transistor S1 at the instant t5, reference is made to the description of FIG. 4.

Since the coils L2 and L2' never convey current simultaneously, it is possible to wind them on a common core. It is also possible, as is shown in the circuit diagram of FIG. 9, to wind the two coils L2 and L2' and the coil L1 on one common core, with the appendent advantages described with reference to FIG. 5 of the smaller voltage change rate when the transistor S1 is turned off, the smaller switching overvoltages and the faster termination of transient phenomena. The signal diagrams for the circuit diagram of the converter according to FIG. 9 are not shown because they can be derived from FIG. 8 in the same manner as described with reference to FIGS. 4 and 6.

What is claimed is:

1. A switched voltage converter comprising: at least one controlled semiconductor switch and a first coil each having a first and a second connection, the first connections being connected together in a series arrangement with at least the one controlled semiconductor switch and the first coil connected between supply voltage terminals, means connecting a control input of said controlled semiconductor switch to a terminal which supplies a switching signal for turning the semiconductor switch alternately on and off for obtaining a desired voltage at a converter terminal, an inductive load having first and second connections, means coupling the first coil to the first connection of the inductive load and to a first electrode of a first semiconductor switching element having a first and a second electrode, the first connections of the controlled semiconductor switch and the first coil being connected to a first terminal of a first capacitor, means connecting a second terminal of the first capacitor via a series arrangement of a second semiconductor switching element and a second coil to the second connection of the controlled semiconductor switch, the second terminal of the first capacitor being connected to a first electrode of a third semiconductor switching element, the current pass direction of the controlled semiconductor switch, viewed in a given direction of current through the capacitor, being the same as that of the first and the second semiconductor switching element and being opposite to that of the third semiconductor switching element, and means coupling a second electrode of the third semiconductor switching element via a second capacitor to the second connection of the first coil and to a fourth semiconductor switching element thereby forming a d.c. connection comprising the third and fourth semiconductor switching elements to the second electrode of the first semiconductor switching element, the first and fourth semiconductor switching elements having the same current pass direction with respect to said second electrode of the first semiconductor switching element.

2. A switched voltage converter as claimed in claim 1, characterized in that the second electrode of the third semiconductor switching element is connected via a third capacitor to the second connection of the controlled semiconductor switch and via a fifth semiconductor switching element to a junction point between the second capacitor and the fourth semiconductor switching element, the third, fifth and fourth semiconductor switching elements having the same current pass direction constituting the said d.c. connection.

3. A switched voltage converter as claimed in claim 1 wherein for a first supply voltage terminal is connected to the second connection of the semiconductor switch and a second supply voltage terminal is connected to the second electrode of the first semiconductor switching element, the said converter terminal conveying the desired voltage being connected to the second connection of the inductive load.

4. A switched voltage converter as claimed in claim 1, wherein the converter is in the form of a symmetrical converter having two controlled semiconductor switches one of which is connected to the first connection and the other of which is connected to the second connection of the first coil, wherein the first connection of the inductive load is connected to a tapping on the first coil and each controlled semiconductor switch is coupled to a respective associated circuit formed by the first and second capacitors, a second coil and first, second, and third semiconductor switching elements, characterized in that in each associated circuit the second electrode of said third semiconductor switching element is connected via a respective third capacitor to the second connection of its associated controlled semiconductor switch.

5. A switched voltage converter as claimed in claim 4, characterized in that the first coil and the second coil are wound on a common core.

6. A switched voltage converter as claimed in claim 1, characterized in that the second connection of the inductive load is connected via a fourth and a fifth capacitor to the second connection of the controlled semiconductor switch and to the second electrode of the first semiconductor switching element, respectively.

7. A switched voltage converter as claimed in claim 1 wherein a first supply voltage terminal is connected to the second connection of the controlled semiconductor switch and a second supply voltage terminal is connected to the second connection of the inductive load, the said converter terminal conveying the desired voltage being connected to the second electrode of the first semiconductor switching element.

8. A switched voltage converter as claimed in claim 1 wherein the first coil and the second coil are wound on a common core.

9. A switched voltage converter comprising: at least one controlled semiconductor switch, a first coil and a first diode switching element connected in series between a pair of supply voltage terminals, first, second and third capacitors, the first capacitor connected in a series arrangement with a parallel circuit comprising a first branch including a second coil connected in series with a second diode and a second branch including a third diode connected in series with the third capacitor, means coupling said series arrangement in parallel with said controlled semiconductor switch, means connecting a junction point between the third diode and the third capacitor to a terminal of the first diode via a DC path including fourth and fifth series connected diodes, means including the second capacitor for connecting a second junction point between the fourth and fifth diodes to a third junction point between the first coil and the first diode switching element, means for coupling an inductive load to said first coil, and means for applying a switching signal to a control electrode of the controlled semiconductor switch for alternately turning the semiconductor switch on and off.

10. A switched voltage converter as claimed in claim 9 wherein the first diode switching element and the controlled semiconductor switch are connected in series opposition between said pair of supply voltage terminals, said fourth and fifth diodes are connected series aiding in said d.c. path, and said second and third diodes are connected with opposite polarity as viewed from a common terminal of the second and third diodes.

11. A switched voltage converter comprising: at least one controlled semiconductor switch, a first coil and a first semiconductor switching element connected in series between a pair of supply voltage terminals, first and second capacitors, second, third and fourth semiconductor switching elements, means connecting a second coil and the second, third and fourth semiconductor switching elements in a series circuit across said pair of supply voltage terminals, means connecting the first capacitor, the second semiconductor switching element and the second coil in a second series circuit coupled across the controlled semiconductor switching element, means including the second capacitor for connecting a first junction between the third and fourth semiconductor switching elements to a second junction point between the first coil and the first semiconductor switching element, means for coupling a load to said first coil, and means for applying a switching signal to a control electrode of the controlled semiconductor switch for alternately turning the semiconductor switch on and off.

12. A switched voltage converter as claimed in claim 11 wherein the first semiconductor switching element and the controlled semiconductor switch are connected in series with opposite current pass direction between said pair of supply voltage terminals, said third and fourth semiconductor switching elements are connected series aiding, and said first and fourth semiconductor switching elements are connected with the same polarity to one of said supply voltage terminals.

13. A switched voltage converter as claimed in claim 11 wherein said first capacitor and said second coil form a resonant circuit.

14. A switched voltage converter as claimed in claim 11 wherein said first capacitor and said first coil are part of a resonant circuit.

15. A symmetrical switched voltage converter comprising: a first coil, first and second controlled semiconductor switches, means connecting the first semiconductor switch, the first coil and the second semiconductor switch in a first series circuit across a pair of supply voltage terminals, means coupling first and second semiconductor switching elements in anti-parallel with said first and second semiconductor switches, respectively, means connecting a first capacitor, a third semiconductor switching element and a second coil in a second series circuit across the first semiconductor switch, means connecting a second capacitor, a fourth semiconductor switching element and a third coil in a series circuit across the second controlled semiconductor switch, a fifth semiconductor switching element coupling the first capacitor to the second capacitor, means coupling a load to a tap point on the first coil, and means for applying switching signals to respective control electrodes of the first and second semiconductor switches for alternately turning the semiconductor switches on and off in mutually exclusive time intervals.

16. A symmetrical switched voltage converter as claimed in claim 15 further comprising a sixth semiconductor switching element connected in series with the fifth semiconductor switching element in the coupling between the first and second capacitors, and third and fourth capacitors coupling a further junction point between the fifth and sixth semiconductor switching elements to respective ones of said pair of supply voltage terminals.

17. A symmetrical switched voltage converter as claimed in claim 15 wherein at least the second and third coils are wound on a common magnetic core.

* * * * *